United States Patent [19]
Otsuka

[11] 4,195,853
[45] Apr. 1, 1980

[54] MECHANICAL SHAFT SEAL

[75] Inventor: Junji Otsuka, Okabe, Japan

[73] Assignee: Nippon Oil Seal Industry Co., Ltd., Tokyo, Japan

[21] Appl. No.: 944,314

[22] Filed: Sep. 21, 1978

[30] Foreign Application Priority Data

Dec. 20, 1977 [JP] Japan ............................. 52-170603

[51] Int. Cl.$^2$ ............................................. F16J 15/34
[52] U.S. Cl. .................................................... 277/92
[58] Field of Search ............. 277/81, 92, 94, 173–177

[56] References Cited
U.S. PATENT DOCUMENTS 4,083,569  4/1978  Negro ................................. 277/117
4,111,436  9/1978  Yazawa ............................... 277/92

Primary Examiner—Robert I. Smith
Attorney, Agent, or Firm—Holman & Stern

[57] ABSTRACT

A mechanical shaft seal has a seal ring made of rubber or the like elastic material and disposed between a housing and a floating seat. The seal ring has a poly-arcuate shape consisting of continuous arcuate portions of different diameters. The maximum outer diameter of the seal ring is larger than the inner diameter of the peripheral surface of a stepped recess formed in the housing, while the minimum inner diameter of the seal ring is smaller than the outer diameter of the peripheral surface of a stepped recess formed on the floating seat.

2 Claims, 10 Drawing Figures

MECHANICAL SHAFT SEAL

BACKGROUND OF THE INVENTION

1. Field of the Invention

The present invention relates to shaft sealing technic and, more particularly, to an improvement in a mechanical shaft seal.

2. Description of the Prior Art

Hitherto, various types of mechanical shaft seals have been used in truck rollers for the construction work and the like machines, a typical one of which is shown in FIG. 1. This mechanical shaft seal has mutually mating steps a' and b' formed in a housing a and a floating seat b' and seal ring c made of a resilient material such as rubber and disposed between the two steps a' and b'. This conventional mechanical shaft seal is advantageous in that the structure of the portion where the seal ring c is fitted is quite simple and easy to machine. In the installation of this type of machanical seal, it is necessary to preserve an interference d as shown in FIG. 2. A larger shaft sealing effect will be obtained by making this interference d larger. However, the large interference d on the other hand will make the assembling of the mechanical seal difficult. To the contrary, if there is provided no interference d, it will be quite diffecult to hold the seal ring c at the right place on the step a'.

Thus, the conventional mechanical shaft seal is extremely difficult and troublesome to assemble and install.

SUMMARY OF THE INVENTION

It is therefore an object of the invention to provide a novel mechanical shaft seal of a type having a rubbery resilient seal ring disposed between a housing and a floating seat.

It is another object of the invention to provide a mechanical shaft seal which is easy to assemble.

It is still another object of the invention to provide a novel mechanical shaft seal making use of a rubbery resilient seal ring having arcuate portions of different diameters.

DESCRIPTION OF THE PREFERRED EMBODIMENTS

According to the invention, there is provided a mechanical shaft seal having a seal ring made of rubber or the like resilient material and disposed between the steped recess formed in the wall of the housing and a metallic floating seat having a substantially L-shaped cross-section, wherein an improvement resides in that the seal ring has a curvilinear shape consisting of continuous arcuate portions of a large and a small diameters.

In the state before the installation, the largest outer diameter of the seal ring is larger than the inner diameter of the peripheral surface of the stepped recess of the housing, while the smallest inner diameter of the seal ring is smaller than the outer diameter of the peripheral surface o the stepped recess of the floating seat. Thus, the mechanical shaft seal of the invention assumes frusto conical shape, before the installation.

Thus, in the state before the installation, gaps are formed between the inner peripheral surface of the seal ring and the juncture surface of the floating seat, and between the outer peripheral surface of the seal ring and the juncture surface of the housing. However, after the installation, these gaps are extinguished and the seal ring makes a uniform and tight contact with the juncture surfaces of the housing and the floating seat. In order to increase the flexibility and the resiliency of the seal ring, waving steps are formed in one side surface of the seal ring.

The invention will be described in detail hereinafter, with reference to the accompanying drawings.

Figure 1:
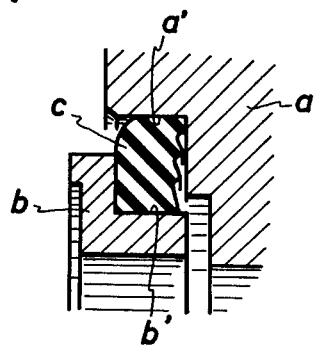
FIG. 1 is a sectional view of an essential part of a conventional mechanical shaft seal.
Figure 2:
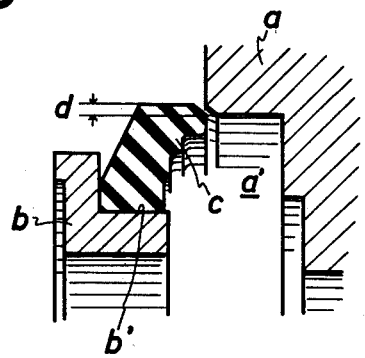
FIG. 2 is an illustration for explaining the drawback of the conventional shaft seal.
Figure 3:
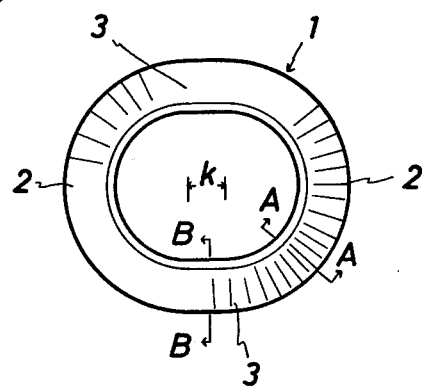
FIG. 3 is a plan view of a first embodiment of the invention.
Figure 4:
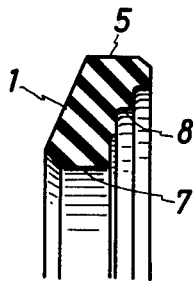
FIG. 4 is an enlarged sectional view taken along the line A—A or B—B of FIG. 3.

FIGS. 3 and 4 in combination show a first embodiment of the invention. More specifically, FIG. 3 is a plan view of the seal ring 1, while FIG. 4 is an enlarged sectional view taken along the line A—A or line B—B of FIG. 3.

A ring-like seal ring 1, made of rubber or the like elastic material, has an elongated circular planar shape having two centers which are spaced by a small distance k. Thus, the seal ring has arcuate large-diameter portions 2 and linear small-diameter portions 3. The seal ring 1 is made to have a substantially constant cross-section over its entire circumference. As will be seen from FIG. 4 showing the cross-section of the seal ring 1, the seal ring is provided with a surface 5 for contacting the housing and a surface 7 for contacting the floating seat formed at its opposite sides. At the same time, one of the side surfaces (the right-hand side surface in FIG. 4) extending between the surfaces 5, 7 constitutes a waving step 8. The seal ring 1 is compressed and deflected when inserted into the shaft-sealing portion, so as to produce an elastic force which acts to urge the surfaces 5, 7 away from each other, as well as an axial sealing and sliding contact pressure.

Figure 5:
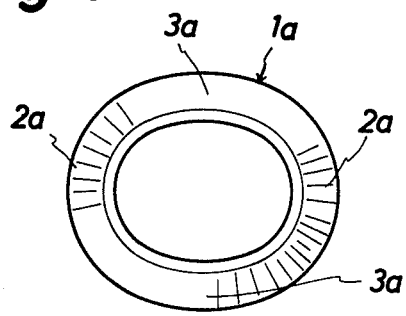
FIG. 5 is a plan view of a second embodiment of the invention.
Figure 6:
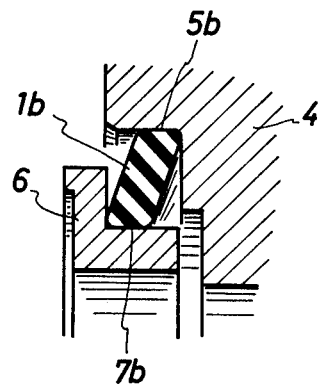
FIG. 6 is a sectional view of the second embodiment in the assembled state.

FIGS. 5 and 6 are a plan view and a sectional view of a seal ring 1a of a second embodiment of the invention. This seal ring 1a has an elliptic planar shape of a small eccentricity, and a constant cross-section over its entire circumference. The elliptic shape consists of large-diameter portions 2a and small-diameter portions 3a.

This seal ring 1a differs from the seal ring 1 in that it has no waving step 8 nor the linear portion. This seal ring 1 is provided with surfaces 5b, 7b for contacting the cooperating surfaces of the housing 5 and the floating seat 7, and assumes as a whole a frusto conical annular shape.

Figure 7:
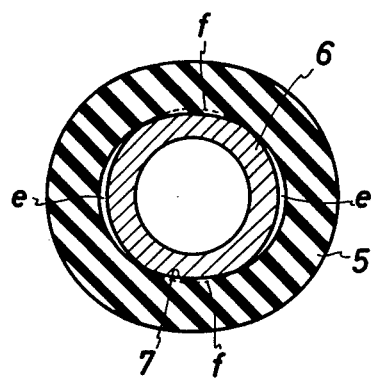
FIG. 7 is a sectional view of a mechanical shaft seal in the state before the installation in which a seal ring is fitted to the peripheral surface of a stepped recess formed in the housing.

Referring now to FIG. 7, it is assumed here that the seal ring of the invention having the described construction is fitted to the peripheral surface of the stepped recess of the floating seat. From the comparison of the shape and size of the seal ring 1 with those of the floating seat 6, it will be seen that gaps e and interferences f are formed at the large-diameter portions 2 and the smaller diameter portions 3, respectively. The circumferential length of the outer periphery of the floating seat 6 is substantially equal to that of the inner periphery of the seal ring 1.

Figure 8:
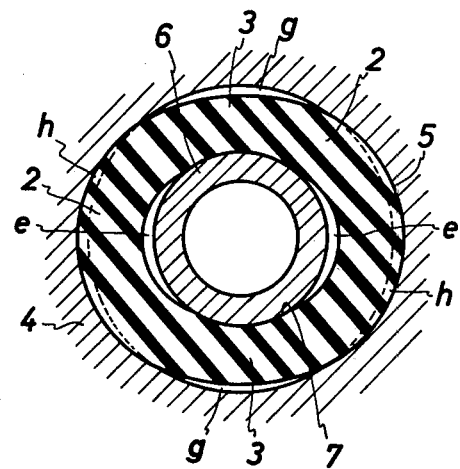
FIG. 8 is a sectional view of a mechanical shaft seal as shown in FIG. 7 in a state before the installation in which the seal ring as shown in FIG. 7 is assembled with a floating seat and fitted to the peripheral surface of the stepped recess of the housing.

Referring now to FIG. 8, it is assumed here that the same seal ring is fitted to the peripheral surface of the stepped recess of the housing, along with the floating seat 6. In this state, the floating seat 6 is cramped between the small-diameter portions 3, 3 of the seal ring 1, due to the elasticity of the latter. In the conventional mechanical shaft seal, it has been often experienced that the seal ring 1 is easily dropped off from the floating seat 6 on which it is mounted. However, according to the invention, such a dropping of the seal ring is avoided due to the cramping force exerted by the small-diameter portions of the seal ring 1.

Figure 9:
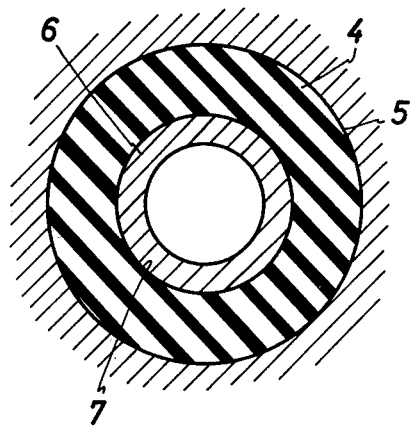
FIG. 9 is a sectional view of the assembly of seal ring and floating seat as shown in FIG. 8, in a state installed in the housing.

Consequently, the insertion of the seal ring along with the floating seat into the housing 4 is made without being hindered by the dropping of the seal ring. In a free state before the completion of the mounting, gaps g are formed between the small-diameter portions 3 of the seal ring 1 and the wall of the housing 4. Meanwhile, interferences h are formed between the large-diameter portions 2 and the wall of the housing 4. Consequently, as the seal ring 1 is forced into the annular space between the housing 4 and the floating seat 6, overcoming the elastic force thereof, it comes to assume a circular shape as shown in FIG. 9, so as to seal the clearance between the housing 4 and the floating seat 6.

As has been described, according to the invention, there is provided a mechanical seal incorporating a seal ring having a cross-section suited for the cooperating surfaces defining the space to be sealed, the seal ring having a poly-arcuate annular shape long and small diameter portions, so that it may elastically engage the cooperating surfaces with gaps and interferences formed between the small or large diameter portions of the seal ring and the cooperating surfaces. Since the seal ring is elastically held by the cooperating surface, the assembling of the mechanical shaft seal is considerably facilitated.

Figure 10:
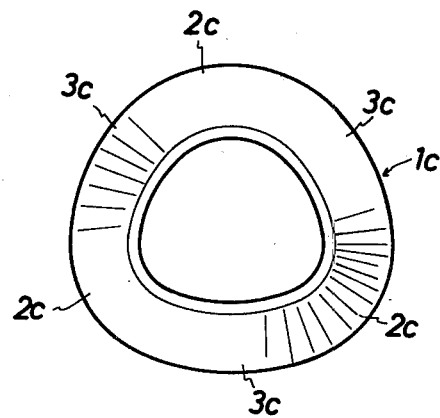
FIG. 10 is a plan view of a third embodiment of the invention.

FIG. 10 has another embodiment in which the seal ring 1c has a curvilinear triangular profile. From FIG. 10 it will be seen that this triangular seal ring also has large-diameter portions 2c and small-diameter portions 3c.

Thus, the seal ring incorporated in the mechanical shaft seal of the invention can have various planar shape, as far as the cross-sectional shape thereof is unchanged.

It will be seen from the foregoing description that the assembling and mounting of the mechanical shaft seal is much facilitated, without being accompanied by the deterioration of the sealing effect, by making the seal ring have a curvilinear shape approximating a circle.

What is claimed is:

1. A mechanical shaft seal having a seal ring disposed between a housing and a floating seat and made of an elastic material such as rubber, characterized in that said seal ring has a curvilinear shape having portions of different diameters, wherein the maximum outer diameter of said seal ring is larger than the inner diameter of the peripheral surface of a stepped recess formed in said housing, while the minimum inner diameter of said seal ring is smaller than the outer diameter of the peripheral surface of a stepped recess formed on said floating seat.

2. A mechanical shaft seal having a seal ring disposed between a housing and a floating seat and made of an elastic material such as rubber, characterized in that said seal ring has a curvilinear shape having portions of different diameters and further characterized in that said mechanical shaft seal is so designed that, before the completion of the mounting of said mechanical seal, gaps are formed between the peripheral surface of a stepped recess formed in said floating seat and the inner peripheral surface of said seal ring and between the peripheral surface of a stepped recess formed in said housing and the outer periphery of said seal ring, said gaps being adapted to be extinguished when the mounting of said mechanical shaft seal is completed.

* * * * *